June 12, 1956

G. TETZNER 2,749,951

BAND SAW BLADE GUIDE

Filed April 1, 1953

INVENTOR.
GUSTAV TETZNER
BY Richard Ernst
AGENT

June 12, 1956 G. TETZNER 2,749,951
BAND SAW BLADE GUIDE
Filed April 1, 1953 2 Sheets-Sheet 2

INVENTOR.
GUSTAV TETZNER
BY Richard Ernst
AGENT

United States Patent Office 2,749,951
Patented June 12, 1956

2,749,951

BAND SAW BLADE GUIDE

Gustav Tetzner, Coburg, Germany

Application April 1, 1953, Serial No. 346,182

Claims priority, application Germany April 17, 1952

9 Claims. (Cl. 143—167)

The object of the present invention is to provide a band saw blade and band knife guide having lateral and rear guide rollers, which can be used with the same good result above as well as below the table, which guarantees perfectly even guiding of the band saw blade until complete wear of the guiding roller rim, and which is equipped with an accident-proof guide pin for the blade and a transparent guard.

In accordance with the present invention, axial displacement of the guide roller shafts is achieved by mounting two separate bearings for each shaft in a sleeve which is axially displaceable by turning of the sleeve relative to a support threadably receiving the sleeve. The axial thrust of the saw blade against each of the guide rollers is received either by a tapered bearing in which the end of the guide roller shaft is seated, or by a collar immediately in back of the guide roller. The displacement of the bearing carrying sleeves causes positive shifting of the guide roller shafts, thus permitting simple and accident-proof adjusting of the band saw guide during operation.

Since the bearings are rotatably, as well as axially, adjustable with the sleeve in which they are mounted, it is apparent that the axial adjustment of the sleeve will dispose of the bearings so that different portions of the latter are subjected to the load or operating pressure, thereby reducing the wear on the bearings. Inadvertent turning of the bearing supporting sleeve is prevented either by a spring loaded bolt engageable with spaced recesses or pockets in a manipulating knob on the sleeve, or by a pre-tensioned leaf spring which frictionally contacts the surface of the bore in which the sleeve is disposed.

Another feature of the present invention consists in the bevelled peripheral surfaces of the later rollers. For facilitating introduction of the band saw blade into the slot between the two lateral rollers, for example, when changing or replacing the blade, the peripheral surfaces of the lateral rollers according to the invention are tapered, so that the saw blade will be guided towards the slot defined between the lateral rollers.

Another feature of the present invention consists in the band saw blade guides being provided with a guide pin.

For serial production of curved wood pieces, the shape has hitherto been sketched on the wood, and then cutting was performed following the sketched outline. Such an operation, however, takes up much time and requires a great deal of attention. With a circular hollow guide pin embodying this invention the points of the teeth run in the center of the hollow pin, which ensures that the distance of the tooth points from the circumference of the guide pin will not vary.

Another feature of the present invention resides in the provision of the band saw blade guide with a transparent guard which permits adjustment of the guide rollers with the guard in operative position while affording an unobstructed view of the rollers and the adjustment knobs for the latter.

The band saw blade guides known so far adopted an angular wood guard. The inconvenience of such a guard is, that, when the angular wood guard placed above the saw blade guide is pulled down over the guide, it covers the band saw blade guide, and when the latter is to be adjusted, the angular wood guard has to be swung aside, which means increased risk of accident.

The annexed drawings show embodiments of an upper band saw blade guide which are illustrative of the present invention, and wherein.

Figure 6:
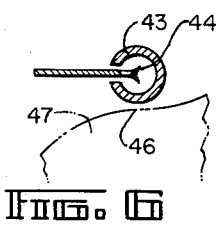
Figure 2:
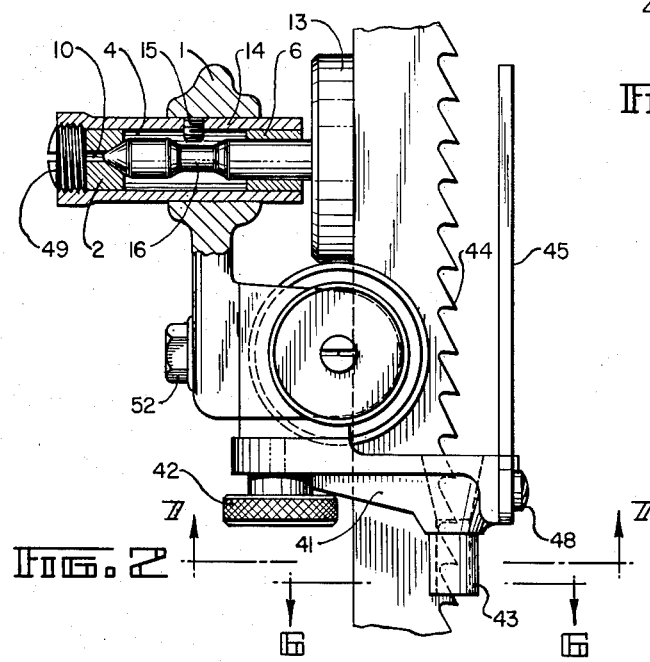
Fig. 2 is a side elevational view of the band saw blade guide with a copying attachment and guard thereon, as shown in Fig. 1, and with the back roller bearing arrangement being shown in axial section.
Figure 7:
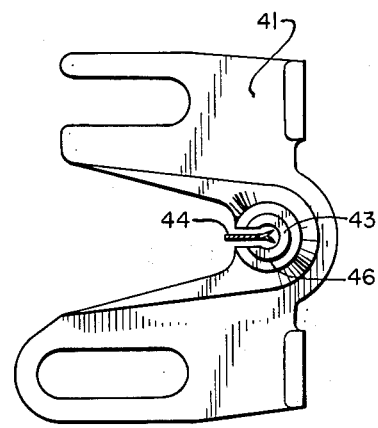

Fig. 6 (sheet 1) is a detailed sectional view taken along the line 6—6 of Fig. 2; and Fig. 7 is a bottom plan view, partly in section, of a generally U-shaped plate included in the copying attachment in accordance with the present invention, and as viewed along the line 7—7 of Fig. 2.

Figure 1:
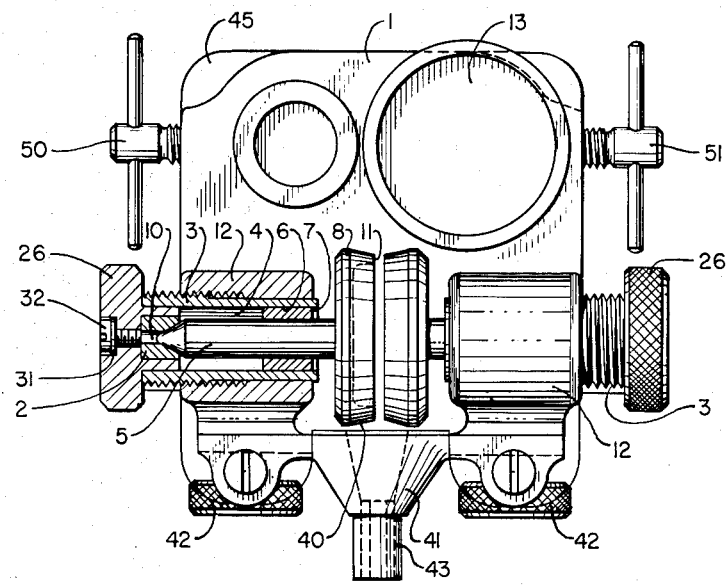
Fig. 1 is a front elevational view, partly broken away and in section, of a band saw blade guide having a copying attachment thereon in accordance with this invention.
Figure 3:
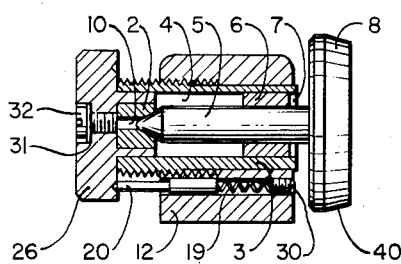
Fig. 3 is a sectional view showing a mechanism for locking a bearing carrying sleeve, and taken along the line 3—3 of Fig. 4.
Figure 4:
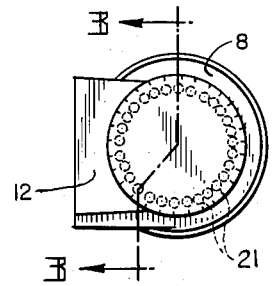
Fig. 4 is a side elevational view of one of the lateral guide roller supports showing the graduations for angular adjustment of the bearing sleeve.

Referring to Figs. 1 and 3, a first embodiment of the invention is there illustrated in which the left lateral roller bearing, shown, in axial section, is seen to include a shaft 5 of the lateral guide roller 8 mounted in a self-lubricating bearing 6. The end of the shaft is provided with a taper of preferably 75°, which is supported by a bearing surface on an adequately shaped and adjustable self-lubricating angular bearing 2. This tapered and adjustable self-lubricating angular bearing has a through bore 10, in which the point of the shaft taper runs freely.

The tapered shape of the end of the shaft 5 in the tapered angular bearing 2 has the advantage of increasing the area of pressure of the shaft end in the angular bearing by about 60% as compared with the area of pressure provided by the ends of a shaft cut in a flat plane normal to its axis, owing to which the specific surface pressure is accordingly reduced and distributed more evenly, thus substantially increasing the service life of the angular bearing. The above structure provides a combined bearing arrangement, since the radial pressure of the guide roller 8 is partly received by a cylindrical bushing 6 direct behind the guide roller 8, whereas, on the other hand, together with the axial pressure, it forms a resulting pressure caused by the leverage due to the pressure of the saw blade against the rim 11 of the guide roller. This resulting pressure acts perpendicularly upon the taper of the angular bearing 2.

The bearings 2 and 6, and a gasket 7 providing a seal around shaft 5 at the outer face of bearing 6, are secured in an externally threaded sleeve 3 which is screwed into a threaded bore provided in a bearing housing 12. Thus, the roller 8 on shaft 5 can be axially adjusted with respect to the other of the lateral guide rollers by turning sleeve 3 with respect to the fixed housing 12. A knurled head or knob 26 is provided on the end of sleeve 3 to permit manual rotation of the latter for effecting the adjustment of the related lateral guide roller. In order to prevent inadvertent turning of the sleeve from an adjusted position, a bolt 20 (Fig. 3) projects slidably from a suitable bore in housing 12 extending parallel to the axis of shaft 5, and is engageable in a selected one of a series of recesses 21 formed in the inside surface or face of the head 26. A spring 19 acts against the bolt 20 to yieldably urge the latter into engagement with the recesses 21, and a screw 30 abuts against one end of the spring 19 to provide for regulating the pressure of the spring about bolt 20. The angular space defined between bearings 2 and 6 within sleeve 3 and around the shaft 5 forms an oil chamber 4, and the bore 10 extending through bearing 2 communicates with a filling orifice extending axially through head 26, with the orifice being closed by a removable screw 32 and a seal 31.

The bearing housing 12 is secured to a plate 1 by screws 52 (Fig. 2), and the plate 1 is in turn secured to the frame of an associated band saw (not shown) by means of a clamping screw 50 (Fig. 1).

Figure 5:
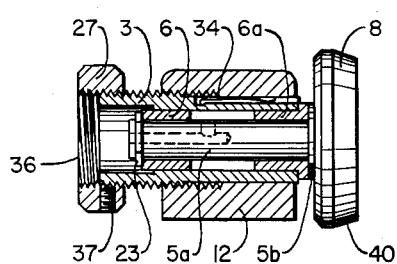
Fig. 5 is a view similar to Fig. 3, but showing another embodiment of the invention.

In Figs. 1, 3 and 5, the bevel 40 of the peripheral surfaces of the lateral rollers 8 according to the invention is preferably at an angle of preferably 15° thereby to facilitate introduction of the band saw blade into the slot defined between the two lateral rollers.

The shaft of the back roller 13 is supported, according to the same taper principle, in a sturdy and adjustable tubular bearing housing 14, having a bushing or bearing 6 and a fixed angular bearing 9 secured therein. The back roller shaft is secured against irksome falling out by means of a hollow set screw 15 extending inwardly from housing 14 and engaging in a narrow portion 16 of the shaft (Fig. 2). The bearing housing 14 extends through the plate 1 and is held in the desired axial position, depending on the width of the band saw blade 44, by a set screw 51. The housing 14 is closed by a threaded plug 49 which seals the bore 10 and the oil chamber 4.

Figs. 1 and 2 show the copying attachment according to the invention. It consists of a plate 41 of generally U-shaped configuration, as shown on Fig. 7, and which is rearwardly open and fixed by two screws 42 to the housing of the lateral roller bearing of the upper band saw blade guide (Figs. 1 and 2). This plate 41 is shaped, at its front part, in the middle, as a hollow guide pin 43. This circular guide pin 43 is provided at its side facing the saw blade with a groove or recess (Fig. 6), in which the toothed edge of the saw blade 44 runs. Since the side of guide pin 43 facing the operator is closed, the operator cannot touch the saw blade during operation. When changing the saw blade, one or the other of the screws 42 is removed, and plate 41 is swung forwardly about the remaining screw 42. When the saw blade guide and the copying attachment are adjusted correctly, the tooth points of the saw blade 44 are placed exactly in the center of the guide pin (Fig. 6), so that the distance of the tooth points from the bearing face 46 of the master plate or template 47 riding against the circumference of the guide pin keeps constant. As the tooth points of blade 44 run in the center of the guide pin 43, even curves and bows of small radius can be cut.

In Figs. 1 and 2, the transparent guard according to the invention is indicated by the reference numeral 45 and is fixed to the plate 41 bearing the guide pin, as by screws 48, and affords a clear view of the guiding members, while preventing contact with the saw blade 44.

Fig. 5 shows another embodiment of the lateral roller bearing in a band saw blade guide constructed in accordance with this invention.

As it is a matter of greatest consequence that the lateral rollers 8 should run quite precisely and that they may be adjusted without any risk of accident, and that the lateral pressure of the rollers 8 should be received in such a way as to prevent one-sided wear of the bearings made of sintered metal, which type of bearing in itself is already known, the lateral pressure of the rollers 8 is received, according to the embodiment of Fig. 5, directly behind the related roller. For that purpose, the lateral roller 8 is provided, on its back, with an end collar 5b. The shaft 5a is mounted in a bearing 6a at the end adjacent the roller, and, at the opposite end, in a bearing 6. The two bearings 6 and 6a receive the lateral pressure of the roller 8 over a relatively broad area. The threaded sleeve 3, mounted in the bearing housing 12, is axially displaceable, according to the invention, in response to turning thereof, and the bearings 6 and 6a, being fixed in sleeve 3, turn with the latter, so that turning of sleeve 3 to alter the axial position of the related roller 8 also changes the locations on the bearings 6 and 6a receiving the loads or pressure thereby to equalize and reduce wear on the bearings. The bearing sleeve 3 is retained in any adjusted position by the action of a pre-tensioned or bowed spring 34 carried thereby and frictionally engaging the surface of the bore in housing 12 which receives sleeve 3. The end of sleeve 3 remote from the roller 8 is covered with a gasket 36 held in position by a milled nut 27 which forms an adjusting knob for sleeve 3 and which, by means of a hollow set screw 37, is secured to the bearing sleeve 3. A lock washer or circlip 23 is provided on the end of shaft 5a remote from the roller 8 and engages against bearing 6 to prevent axial displacement of the shaft relative to the bearing 6 and 6a and hence relative to sleeve 3, so that the related roller can be moved away from the other roller (not shown) by suitable axial displacement of sleeve 3.

What I claim is:

1. In a band saw blade guide having two coaxial lateral rollers defining a slot therebetween for the guiding reception of a band saw blade; the combination of a rotatable shaft for each roller and having the related roller secured to one end thereof, bearings having said shaft rotatably journalled therein, a bearing housing having a threaded bore extending therethrough, and an externally threaded sleeve screwed into said bore and having said bearings secured therein so that turning said sleeve effects axial movement of the latter and of the related roller and simultaneously changes the portions of said bearings receiving the shaft loads to reduce wear on the bearing.

2. In a band saw blade guide; the combination according to claim 1; wherein said other end of said shaft is conical, and one of said bearings has a tapering surface at the same angle as that of said conical end of the shaft and rotatably receiving said conical end to take-up the axial thrust of the shaft, said one bearing having a central, axial bore therein in which the tip of said conical end of the shaft freely runs and serving as an oil supply duct, and further comprising a knob on the end of said sleeve adjacent said one bearing and having a filling orifice therethrough communicating with said oil supply duct, and closure means for said filling orifice.

3. In a band saw blade guide; the combination according to claim 2, wherein said conical end of the shaft encloses an angle of 75°.

4. In a band saw blade guide; the combination according to claim 1, further comprising a radially enlarged knob on the end of said sleeve remote from the related roller and having a circumferential series of spaced apart recesses in the face of the knob directed toward said bearing housing, said bearing housing having an auxiliary bore parallel to said threaded bore, a locking bolt slidable in said auxiliary bore and projecting from the latter toward said face of the knob, and spring means acting on said bolt to urge the latter into a selected one of said recesses of the knob whereby said sleeve is held against inadvertent turning from an adjusted position thereof.

5. In a band saw blade guide; the combination according to claim 1, further comprising a pre-tensioned leaf spring carried by said sleeve and frictionally contacting the surface of said bore of the bearing housing to prevent inadvertent turning of said sleeve.

6. In a band saw blade guide; the combination according to claim 1, further comprising a lock-washer on the end of said shaft remote from the related roller axially in back of the adjacent one of said bearings so that turning of said sleeve in the direction moving the sleeve axially away from the sleeve associated with the other roller serves to move the related roller axially away from said other roller.

7. In a band saw blade guide; the combination according to claim 1, wherein the peripheries of said rollers are bevelled along the confronting edges thereof to facilitate introduction of a band saw blade into the slot defined between the rollers.

8. In a band saw blade guide; the combination according to claim 1, further comprising a generally U-shaped plate, screws securing the extremities of said plate to said bearing housings associated with the lateral rollers with the space defined within said U-shaped plate opening rearwardly between said bearing housings, said plate having a hollow, cylindrical guide pin at the center thereof and formed with a longitudinal slot opening rearwardly to receive a saw blade guided between the rollers, the lateral rollers being axially adjusted so that a saw blade guided therebetween enters said slot of the hollow guide pin with the tooth points of the saw blade lying along the axis of the external cylindrical surface of said guide pin.

9. In a band saw blade guide, the combination according to claim 8, further comprising a transparent guard member, means removably securing said guard member to said plate in a substantially vertical plane disposed in front of said guide pin and the lateral rollers thereby to prevent contact with the teeth of the saw blade while providing an unobstructed view of the lateral rollers during the adjustment thereof.

References Cited in the file of this patent

UNITED STATES PATENTS

| | | |
|---|---|---|
| 394,594 | Murray | Dec. 18, 1888 |
| 436,143 | Mead | Sept. 9, 1890 |
| 683,373 | Allen | Sept. 24, 1901 |
| 964,846 | Brueggemann | July 19, 1910 |
| 1,591,456 | Knecht | July 6, 1926 |
| 1,725,089 | Lemmer | Aug. 20, 1929 |

FOREIGN PATENTS

| | | |
|---|---|---|
| 910,796 | France | Feb. 18, 1946 |
| 125,263 | France | June 24, 1878 |